United States Patent
Leung et al.

(10) Patent No.: US 8,675,572 B1
(45) Date of Patent: Mar. 18, 2014

(54) DYNAMIC ASYNCHRONOUS-CAPSULE TIMER FOR TRAFFIC CHANNEL ASSIGNMENT MESSAGES

(75) Inventors: Anthony Leung, Kansas City, MO (US); Jasinder P. Singh, Olathe, KS (US); Maulik K. Shah, Overland Park, KS (US); Ashish Bhan, Shawnee, KS (US); Jason P. Sigg, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 610 days.

(21) Appl. No.: 12/423,598

(22) Filed: Apr. 14, 2009

(51) Int. Cl.
*H04W 4/00* (2009.01)

(52) U.S. Cl.
USPC .......................................... 370/329; 370/338

(58) Field of Classification Search
USPC .................................................. 370/329, 338
See application file for complete search history.

(56) References Cited

U.S. PATENT DOCUMENTS

| | | | |
|---|---|---|---|
| 2001/0015956 A1* | 8/2001 | Ono .............................. | 370/229 |
| 2004/0066763 A1* | 4/2004 | Hashimoto et al. ........... | 370/329 |
| 2004/0190471 A1* | 9/2004 | Bender et al. ................. | 370/329 |
| 2007/0153719 A1* | 7/2007 | Gopal .......................... | 370/328 |
| 2007/0238442 A1* | 10/2007 | Mate et al. ..................... | 455/403 |
| 2008/0139232 A1* | 6/2008 | Santhanam ................... | 455/519 |

\* cited by examiner

*Primary Examiner* — Noel Beharry
*Assistant Examiner* — Kodzovi Acolatse

(57) ABSTRACT

Methods and systems for periodically transmitting traffic channel assignment (TCA) messages in a radio access network are disclosed herein. An exemplary method involves (a) periodically transmitting a capsule that includes one or more TCA messages, wherein an async timer specifies a period that is used to periodically transmit the capsule; and (b) using one or more backhaul-latency indicators as a basis for determining the period that is used to periodically transmit the capsule. The method may further comprise periodically repeating (b) in order to dynamically update the async timer to reflect changes in backhaul latency.

19 Claims, 4 Drawing Sheets

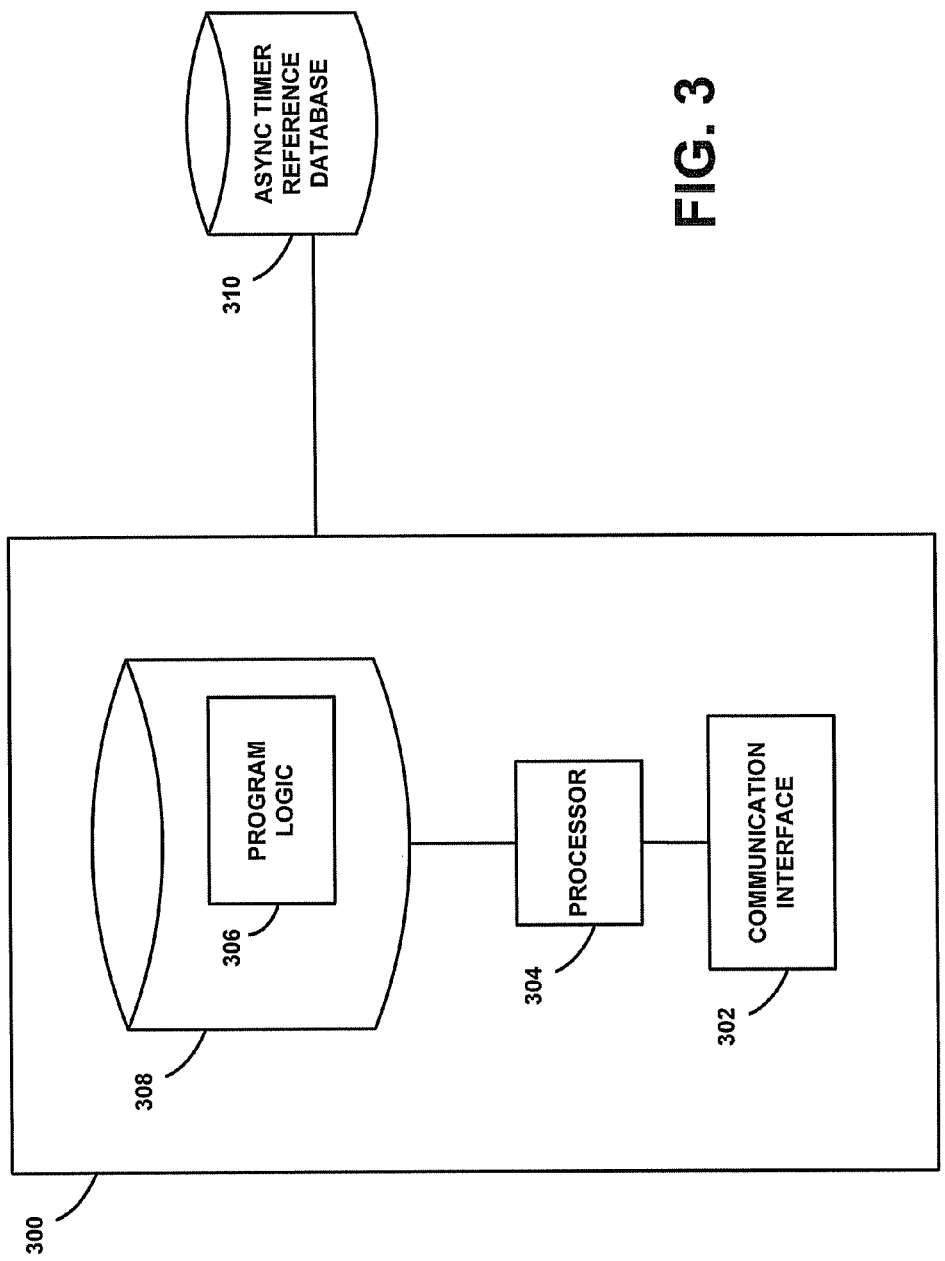

DYNAMIC ASYNCHRONOUS-CAPSULE TIMER FOR TRAFFIC CHANNEL ASSIGNMENT MESSAGES

BACKGROUND

Many people use access terminals, such as cell phones and personal digital assistants (PDAs), to communicate with cellular wireless networks. These access terminals and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data connectivity.

Recently, service providers have introduced access terminals and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to access terminals using a combination of time-division multiplexing (TDM) on the forward link (from the network to access terminals) and CDMA technology on the reverse link (from access terminals to the network). Furthermore, some access terminals, known as hybrid access terminals or hybrid wireless access terminals, can communicate with both 1x networks and EV-DO networks.

In a wireless network (also referred to interchangeably as a "wireless access network" or "access network"), a traffic channel assignment (TCA) message is used to notify an access terminal of the traffic channel that is assigned to the access terminal. Thus, when an access terminal requests to connect to an access network, the access network assigns a traffic channel to the access terminal so that the network scheduler sees the access terminal as active and allocates timeslots to the access terminal for its communications. The access network then conveys identifies the traffic channel that is assigned in a traffic channel assignment message.

Overview

In a typical access network providing service under EV-DO, when a base station (i.e., base transceiver station (BTS)) receives a request to connect, the BTS passes the request on to its associated radio network controller (RNC), which in turn assigns a traffic channel and replies to the BTS with the TCA message (or simply a message including information for the TCA message such as an identifier for the assigned traffic channel). The BTS may then wait for a period before it transmits the TCA message to the requesting access terminal. In particular, the BTS stores all TCA messages received during a given period of time, and includes all these TCA messages in an asynchronous capsule, which it transmits periodically.

In the process of providing a TCA message, delay may be introduced between the BTS receiving a request to connect from an access terminal, and the BTS sending a TCA message to the access terminal. In particular, delay may be experienced while the BTS sends the request to connect to the RNC, waits for the RNC to process the request and assign a traffic channel, and waits for the RNC to send back a TCA message (or more generally information indicating the assigned traffic channel), so that the BTS can transmit the TCA message to the access terminal. This delay, which may be referred to as "backhaul latency," may cause access terminals to experience increased and/or sporadic delays when connecting to an access network. As a general matter, such delays may be undesirable.

Accordingly, methods and systems are provided herein that may help reduce the delay experienced while an access terminal waits to receive a TCA message, and/or make the delay more predictable. In particular, a BTS may evaluate various indicators of backhaul latency, and based upon these indicators, adjust the period between transmissions of asynchronous capsules to compensate for changes in backhaul latency.

In one aspect, a method for transmitting traffic channel assignment (TCA) messages in a radio access network is disclosed, the method comprises: (a) periodically transmitting a capsule (e.g., an asynchronous capsule) that includes one or more TCA messages, wherein a timer (e.g., an asynchronous-capsule timer) specifies a period that is used to periodically transmit the capsule; and (b) using one or more backhaul-latency indicators as a basis for determining the period that is used to periodically transmit the capsule. The method may further comprise (c) determining a current value for each of the one or more backhaul-latency indicators; wherein the current values of the one or more backhaul-latency indicators are used as the basis for determining the period that is used to periodically transmit the capsule. Yet further, the method may involve periodically repeating (c) and/or (b) in order to periodically update the async timer to reflect changes in backhaul latency.

In another aspect, a method for transmitting traffic channel assignment (TCA) messages in a radio access network is disclosed. The method comprises (a) starting a timer that runs for a specified period; (b) after starting the timer and before expiration of the timer, receiving one or more TCA messages; (c) upon the expiration of the timer, sending a capsule includes the one or more received TCA messages; (d) determining one or more backhaul-latency indicators and based at least in part on the backhaul-latency indicators, updating the specified period for which the timer runs; and (e) after updating the specified period, repeating (a)-(c).

In another aspect, a system configured to transmit TCA messages in a coverage area of a radio access network is disclosed. The system comprises (i) a communication interface configured to engage in air-interface communications; (ii) at least one processor; (iii) program logic that is executable by the at least one processor to: (a) periodically transmit a capsule, wherein each transmitted capsule includes one or more TCA messages in each transmission; (b) provide an async timer that specifies a period that is used to periodically transmit the capsule; and (c) use one or more backhaul-latency indicators as a basis to determine the period that is used to periodically transmit the capsule.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 3 is a simplified block diagram illustrating a system configured to transmit TCA messages, according to an exemplary embodiment.

DETAILED DESCRIPTION

Figure 1:
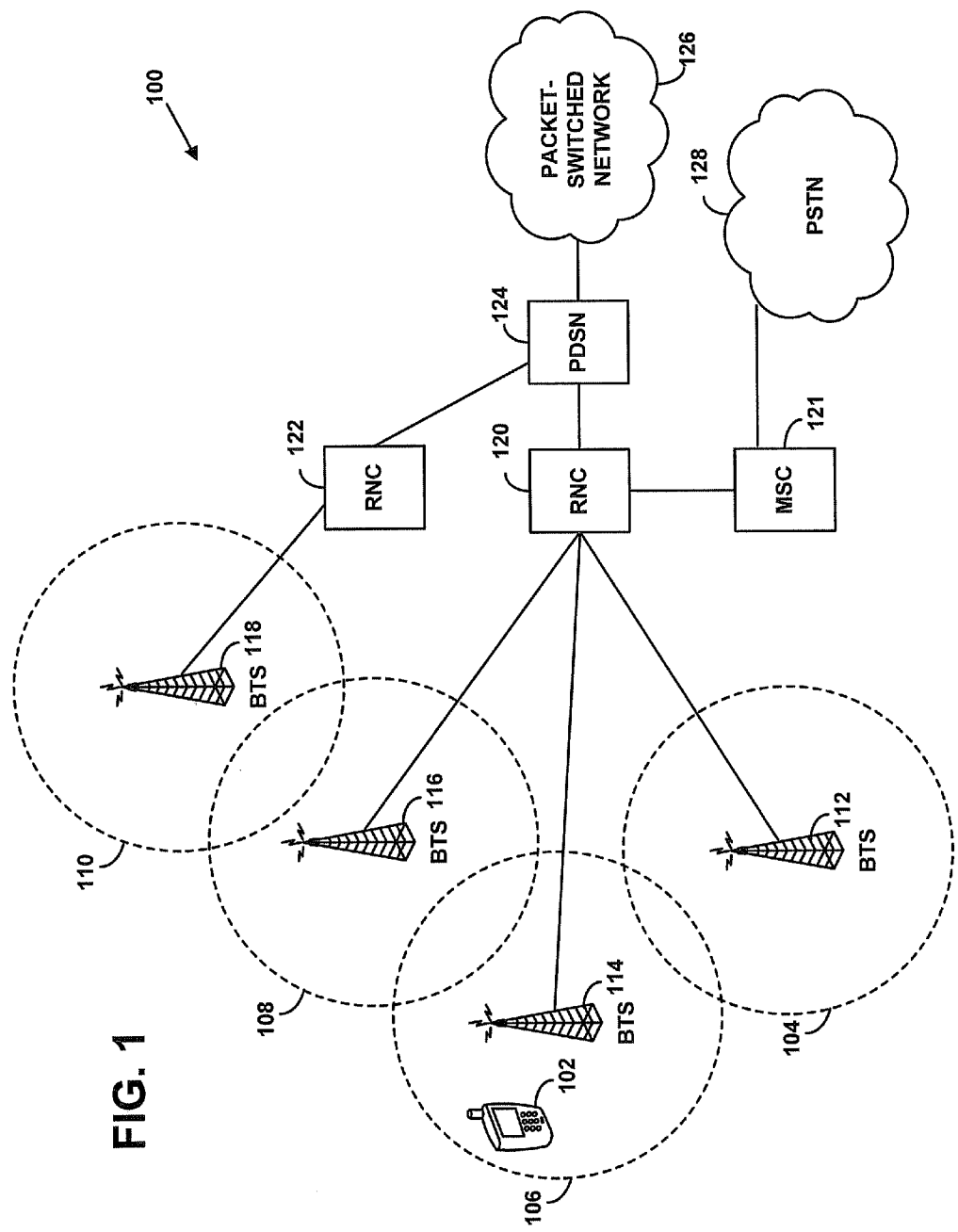
FIG. 1 is a simplified block diagram illustrating a wireless access network, according to an exemplary embodiment.

FIG. 1 is a simplified block diagram illustrating a wireless access network 100, which may also be referred to as a radio access network (RAN). In order to provide wireless service, access network 100 may include numerous base transceiver station (BTS) towers, such as BTSs 112-118, which together provide substantially contiguous coverage for wireless subscribers. Each BTS 112-118 can be configured to define a respective cell site, as well as number of cell sectors, such as sectors 104-110. Groups of BTS towers in a given region will then typically be connected with a radio network controller (RNC) (also known as a base station controller (BSC)). In access network 100, BTSs 112-116 are connected to RNC 120, and BTS 110 is connected to RNC 122. An RNC may then connect with a switch, such as mobile switching center (MSC) 121, which provides connectivity with a transport network, such as a public switched telephone network (PSTN) 128, or with a gateway, such as a packet-data serving node (PDSN) 124, which provides connectivity with a packet-switched network 126 such as the Internet.

With this arrangement, when an access terminal 102 (such as a cellular telephone or wirelessly-equipped portable computer or personal digital assistant, for instance) is positioned in a sector, the access terminal 102 may communicate via an RF air interface with a serving BTS. For instance, when access terminal 102 is located in sector 106, the access terminal may connect to BTS 114. Consequently, a communication path can be established between the access terminal 102 and PSTN 128 or packet-switched network 126 via an RF air interface, BTS 114, RNC 120 and MSC 121 or gateway PDSN 124, respectively.

Communications between access terminal 102 and BTS 114 generally proceed according to one or more air interface protocols, such as Code Division Multiple Access (CDMA), Time Division Multiple Access (TDMA), Global System for Mobile Communications (GSM), 1xRTT, 1xEV-DO, iDEN, AMPS, GPRS, UMTS, EDGE, WiMAX (e.g., IEEE 802.16), LTE, microwave, satellite, MMDS, Wi-Fi (e.g., IEEE 802.11), and/or Bluetooth, among others. Air interface communications from the base station to the access terminal may be referred to as "forward link" or "downlink" communications, while those from the access terminal to the base station may be referred to as "reverse link" or "uplink" communications.

To provide the arrangement of FIG. 1 in practice, each access terminal is commonly equipped with a "access terminal modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by base station 108 include EV-DO, and accordingly, chipsets implemented by an access terminal and a base station may have EV-DO operating modes (e.g., 1xEV-DO Rev. 0 or Rev. A), and may be programmatically set to operate in that mode. It should be understood that other chipsets, including upgrades to the chipsets named herein, as well as others providing similar functionality, may also be utilized without departing from the scope of the invention.

Under EV-DO, the forward link uses time-division multiplexing (TDM) in order to allocate all of the sector's forward-link power to a given access terminal at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, Medium Access Control (MAC) channels (i.e., channels included in the MAC layer), a "control" channel, and, if any traffic exists, forward traffic channels.

Forward traffic channels are used for transmission of user data (e.g., the data making up an incoming communication, incoming file, etc.) from a base station to an access terminal. In EV-DO, only one access terminal receives data via a forward traffic channel in each time slot. To accommodate this configuration, a scheduler is used to assign a particular access terminal for each time slot. As such, each packet sent on the traffic channel includes a preamble, which in turn includes a MAC Index indicating the access terminal for which the packet is intended. The scheduler may be integrated into an RNC or exist as a separate entity that monitors and schedules user data being sent from one or multiple RNCs.

When a base station (i.e., base transceiver station (BTS)) receives a request to connect from an access terminal, the BTS passes the request on to its associated radio network controller (RNC). The RNC then determines which traffic channel to assign based on such factors as the available traffic channels and the type of service being requested (e.g., voice, data, etc.), among others. The RNC then sends a traffic channel assignment (TCA) message to the BTS (or simply a message including information that can be used by the BTS to generate a TCA message to be sent to the access terminal). In turn, the BTS sends the TCA message to the access terminal, thereby notifying the access terminal of its assigned air-interface traffic channel. In an exemplary embodiment, each TCA message includes a Walsh Code and/or a MAC Index that corresponds to the assigned traffic channel.

Upon receipt of the TCA message, the access terminal tunes to the assigned traffic channel (as indicated by the Walsh code and/or MAC Index in the TCA message) and receives blank frames transmitted by the base station. The access terminal then confirms receipt of the blank frames by sending a preamble of blank frames to the base station. In turn, the access terminal acknowledges receipt of the blank frames by sending an Acknowledgement Order message to the access terminal. The access terminal then acknowledges with an Acknowledgement Order message to the base station over the traffic channel.

Control channel information may be sent over the control channel in control channel "capsules," which are sets of packets that may be sent from time-to-time via the control channel. In EV-DO, control channel information may be sent in a "synchronous capsule" and/or an "asynchronous capsule." Synchronous capsules are sent periodically, typically at intervals that are multiples of 256 time slots. Asynchronous capsules, on the other hand, may be sent as needed, in any time slot in which a synchronous capsule is not being transmitted. According to an exemplary embodiment, however, asynchronous capsules are also transmitted periodically. Further, the asynchronous capsule and/or the synchronous capsule may include one or more TCA messages, as well as other information.

In an exemplary embodiment, the BTS does not send every TCA message to its intended access terminal, immediately when the BTS receives the message from the RNC. Rather, the BTS groups TCA messages (which may be intended for a number of different access terminals), waits until the next asynchronous-capsule transmission, in which the BTS includes the group of TCA messages. In particular, the BTS includes substantially all TCA messages received since the transmission of the last asynchronous capsule. It should be understood that in some instances, when the async timer specifies that the next asynchronous capsule should the transmitted, the BTS may not have receive any TCA messages since the last asynchronous capsule. In this scenario, the BTS may refrain from transmitting the asynchronous capsule, or alternatively, may transmit the asynchronous capsule without any TCA messages.

The BTS further provides, or may be provided with access to, an asynchronous capsule timer (referred to as the "async timer"). The async timer specifies the period between asynchronous-capsule transmissions, and accordingly the period during which the BTS groups TCA messages for inclusion in the next asynchronous-capsule transmission. Thus, the BTS restarts the timer after each transmission of an asynchronous capsule, waits for the period specified by the timer, then transmits another asynchronous capsule, and so on.

According to an exemplary embodiment, the BTS dynamically updates the duration of the async timer (i.e., the period specified by the timer) according to compensate for backhaul latency. Generally, backhaul latency is the delay experienced between the BTS receiving a request to connect from an access terminal, and the BTS responding to the access terminal with a TCA message. The BTS may consider various indicators of backhaul latency, such as congestion on the RNC-BTS communication path and/or RNC-processor usage (e.g., how busy the RNC processor(s) is or are), and increase or decrease the period between asynchronous-capsule transmissions when it determines that backhaul latency is lower or higher, respectively.

Figure 2A:
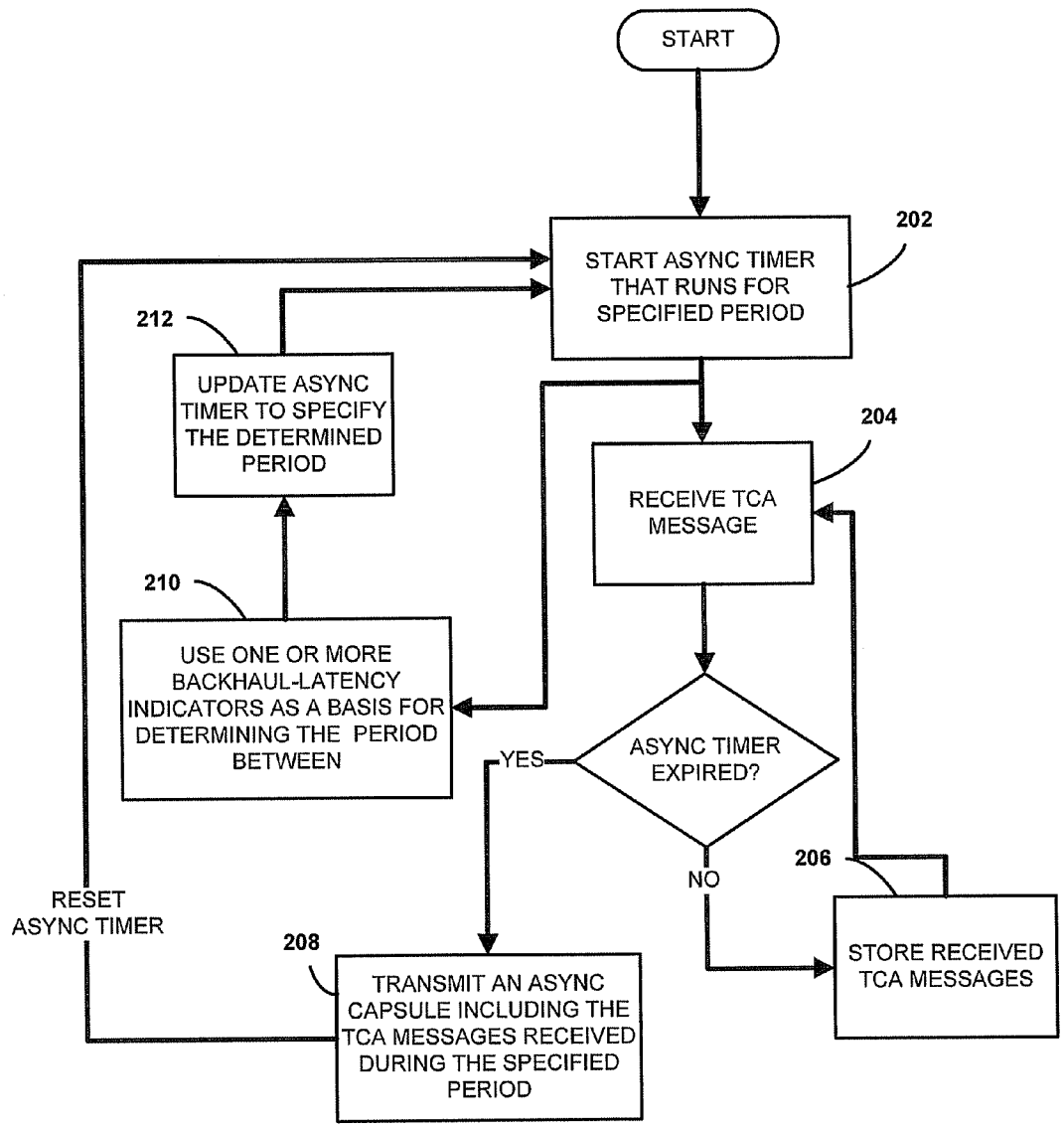
FIG. 2A is a simplified flow chart illustrating a method for transmitting TCA messages, according to an exemplary embodiment.

FIG. 2A is a simplified flow chart illustrating a method for transmitting TCA messages, according to an exemplary embodiment. The method is described by way of example, with reference to a BTS performing the method. However, it should be understood that other network entities (such as an RNC, for instance) may also carry out the method or portions thereof, without departing from the scope of the invention. An exemplary method, such as that illustrated by FIG. 2A, may be employed to vary the period of the async timer, and thus the time between consecutive transmissions of the async capsule, in order to compensate for backhaul latency. Generally, the method involves periodically transmitting a capsule that includes one or more TCA messages according to a timer having dynamically updated duration (i.e., period), which is based upon one or more backhaul-latency indicators, as shown by blocks 202-208.

More specifically, the method involves the BTS starting the async timer, as shown by block 202. The timer then runs for its specified period. During this period, the BTS may receive one or more TCA messages from an RNC, as shown by block 204. The TCA messages received while the async timer is running (e.g., in between asynchronous-capsule transmissions) may be stored by the BTS, as shown by block 206. Then, at or near the expiration of the async timer (i.e., at or near the end of its specified period), the BTS transmits an asynchronous capsule that includes the TCA messages that it received during the specified period, as shown by block 208. The async timer may then be reset and the process illustrated by blocks 202-208 repeated in order to periodically transmit the asynchronous capsule.

The method further involves using one or more backhaul-latency indicators as a basis for determining the period between asynchronous-capsule transmissions (i.e., the period specified by the async timer), as shown by block 210. When a new period is determined, the async timer may be updated to indicate the newly-determined period, as shown by block 212. Importantly, in an exemplary embodiment, blocks 210-212 are performed from time-to-time so that the period in between asynchronous-capsule transmissions changes to dynamically compensate for changes in backhaul latency.

The manner in which blocks 210-212 are repeated may vary as a matter of engineering design choice. For example a new period for the async timer may be determined while the async timer is running (e.g., at least partially while blocks 302-308 are being performed, as shown) or after the async timer ends. Furthermore, how frequently the async timer is adjusted may also vary. For instance, the async timer may be updated at the beginning of each period (e.g., every time blocks 302-308 are performed), or may not be updated every period (e.g., only updated every third or fourth period, for instance). Alternatively, the BTS may wait a predetermined period of time between each update to the async timer—for instance, updating the timer every 30 seconds.

Typically, when the async timer is updated, the length of the updated period will be reflected in subsequent iteration, when the async timer starts over at block 302. However, it should be understood that the period of the async timer could be shortened or lengthened mid-period, without departing from the scope of the invention. Further, in the event that a newly calculated period of the async timer is the same as the existing period, the async timer may simply remain unchanged.

The backhaul-latency indicators may take various forms. Preferably, the backhaul-latency indicators that are considered include both (a) the level of processor utilization at the RNC serving the BTS (i.e. the RNC-processor usage) and (b) one or more traffic characteristics of the communication path between the BTS and RNC, such as congestion on the BTS-RNC communication path. The RNC-processor usage is indicative of delay that may be experienced in processing a TCA message at the RNC, and thus may be used as an indicator of the backhaul latency that may be experienced during the process of providing a TCA message to an access terminal. More specifically, the RNC-processor usage may be indicative of delay experienced while the RNC determines which traffic channel to assign, assigns a Walsh Code, etc. Similarly, the congestion on the BTS-RNC communication path may be indicative of backhaul latency introduced when the BTS sends a request to connect to the RNC and/or when the RNC responds by sending the TCA message to the BTS. Accordingly, determining the one or more backhaul-latency indicators preferably involves determining the RNC-processor usage and/or the congestion on the BTS-RNC communication path.

It should be understood that while the BTS preferably uses both the RNC-processor usage level and at least one characteristic of the BTS-RNC communication path such as congestion, the BTS may alternatively use only one backhaul-latency indicator to adjust the period of the async timer, such as the RNC-processor usage, or a measure of congestion on the BTS-RNC communication path such as the round-trip delay between the BTS and the RNC. Furthermore, any other appropriate indication of backhaul latency or combination of multiple indications may be employed, without departing from the scope of the invention.

Regarding how the backhaul-latency indicators may be used to determine the duration of the async timer, if the RNC-processor usage is higher or lower than at a previous time, the RNC may be slower or faster, respectively, to process a request to connect, generate a TCA message, etc. As a result, there may be an increase or decrease, respectively, in the time it takes for the BTS to receive the TCA message from the RNC. Likewise, if the connection between the RNC and the BTS is more or less congested, it typically takes more or less time, respectively, for the TCA message to get to the BTS from the RNC.

Accordingly, when these (or other) backhaul-latency indicators indicate higher backhaul latency, the BTS may compensate by decreasing the period specified by the async timer, which may reduce the overall latency experienced by an access terminal requesting to connect (i.e., delay between when an access terminal sends a request to connect and receives the responsive TCA message). Likewise, when backhaul-latency indicators indicate lower backhaul latency, the BTS may compensate by increasing the period specified by the async timer, which in turn may increase latency experienced at the BTS (possibly in such a manner that the overall latency remains substantially constant or remains substantially within a known range). In a further aspect, the BTS may dynamically increase/decrease the async-timer period so as to maintain an overall latency (i.e., backhaul latency plus the delay between the BTS receiving the TCA message and the BTS including the TCA message in the next asynchronous capsule) that is substantially constant.

Figure 2B:
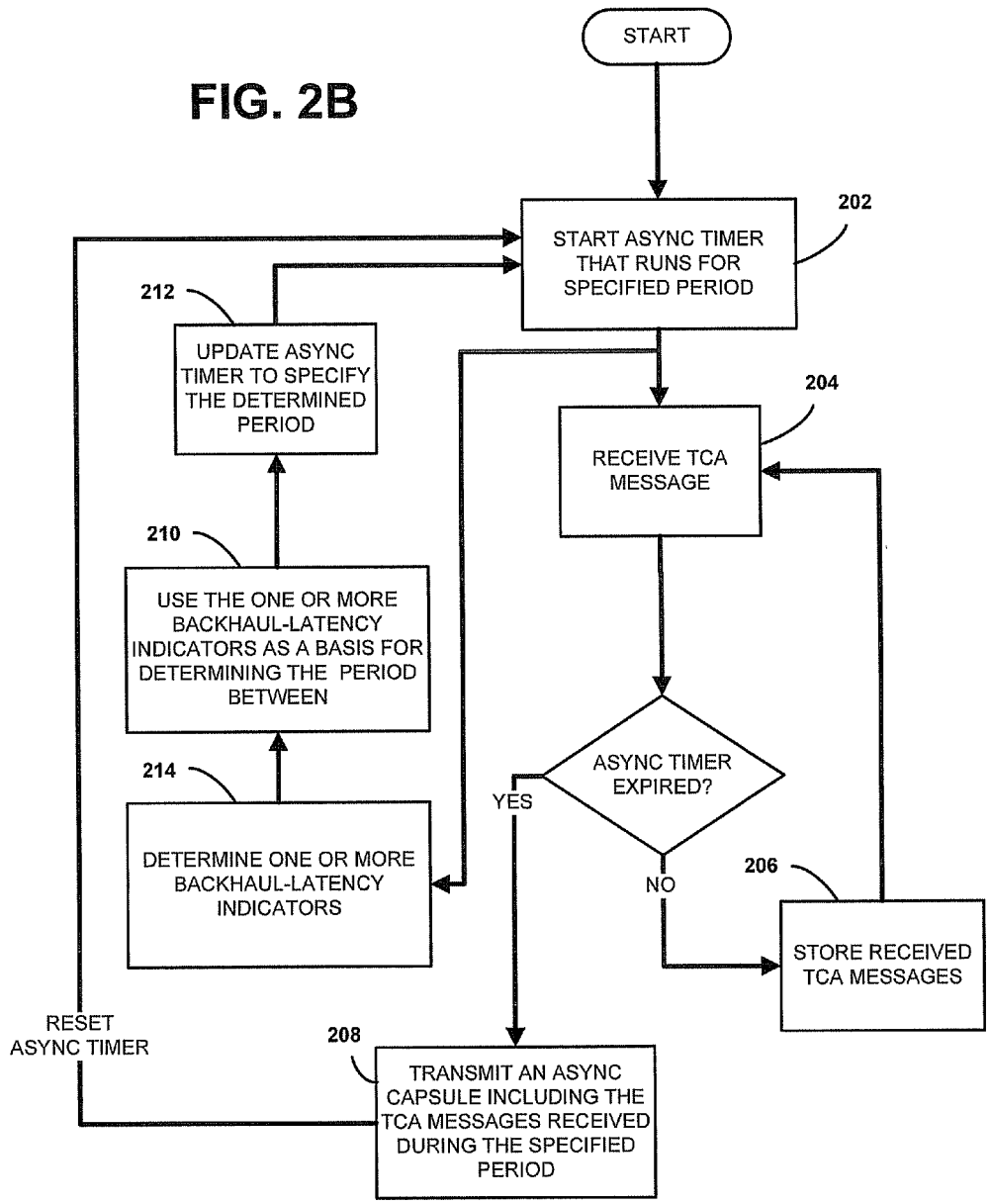
FIG. 2B is another simplified flow chart illustrating a method for transmitting TCA messages, according to an exemplary embodiment.

FIG. 2B is another simplified flow chart illustrating a method for transmitting TCA messages, according to an exemplary embodiment. FIG. 2B is similar to FIG. 2A, with the addition that the method further involves determining the one or more backhaul-latency indicators, as shown by block 214. In the preferred embodiment, the backhaul-latency indicators include the RNC-processor usage and one or more traffic characteristics of the BTS-RNC communication path, such as congestion. As illustrated, the one or more backhaul-latency indicators may be determined (i.e., current measures or values of the indicators may be evaluated, calculated or determined) before each repetition of blocks 210-212. Alternatively, the one or more backhaul-latency indicators may be determined and updated according to another schedule, which may be set as a matter of engineering design choice.

The traffic characteristics of the BTS-RNC communication path, and in particular, the congestion on the BTS-RNC communication path, may be determined using various techniques. Preferably, the BTS uses the round-trip delay between the BTS and RNC as a measure of the congestion. The round-trip delay may be determined by pinging the RNC (i.e., sending a PING message to the RNC) and determining how long it takes to receive a response from the RNC (i.e., a PING response message). Alternatively, the RNC might include a timestamp in each of its transmissions (or each of its transmissions of particular types, such as "keep-alive" messages) that it typically sends to the BTS. The BTS can then use the timestamp to determine delay on the BTS-RNC communication path (by either using the one-way delay from the RNC to the BTS, or doubling the one-way delay as an estimate of the round-trip delay). Other techniques are possible as well.

The RNC-processor usage may also be determined using various techniques and may take various forms. For instance, the BTS may determine the amount or percentage of an RNC's processing resources that are in use and/or the amount or percentage of an RNC's processing resources that are available for the processing of requests to connect (e.g., locating and assigning a traffic channel, generating a TCA message, etc.), and use the determined amount or percentage as a measure of the RNC-processor usage. To make this determination, the BTS may be automatically informed of the RNC-processor usage (or measures thereof) by the RNC. For example, the RNC might include an indication of its processor usage in each keep-alive message that the RNC conventionally sends to the BTS. As another example, the BTS may send a PING message to the RNC. Then, in its PING response message, the RNC may include an indication of its processor usage. When the RNC-processor usage is included in a PING response message, the BTS may thereby determine both the RNC-processor usage and the RNC-BTS delay in one message transaction. Alternatively, the BTS may simply query the RNC for its processor usage. Other techniques for determining the RNC-processor usage are also possible.

FIG. 3 is a simplified block diagram illustrating a system 300 configured to transmit TCA messages, according to an exemplary embodiment. Preferably, the system takes the form of a BTS providing service in a given coverage area of a wireless access network. The system 300 includes a communication interface 302 that is configured to engage in air-interface communications, at least one processor 304, and program logic 306 that is executable by the processor 304. The program logic 306 is stored in data storage 308, and is executable by the processor 304 to provide the functionality of the system described herein and otherwise. The program logic and/or processor may be implemented by any combination of software or program code (in any appropriate programming language), firmware, and/or hardware—or may be implemented in any other appropriate manner known in the art.

In an exemplary embodiment, the program logic 306 is executable to periodically transmit the asynchronous capsule, and include one or more TCA messages in each transmission of the async capsule. The program logic 306 is further executable to provide an async timer that specifies the period with which to periodically transmit the capsule, and to use one or more backhaul-latency indicators as a basis to determine the period that is used to periodically transmit the capsule (i.e., the period specified by the async timer).

The system 300 may be further configured to monitor and/or evaluate various factors that may contribute to backhaul latency, such as RNC-processor usage and/or traffic characteristics on the BTS-RNC communication path, and use the backhaul-latency indicators to adjust the async timer. For instance, in an exemplary embodiment, the system 300 may be configured to determine the RNC-processor usage and/or the congestion on the BTS-RNC communication path, using techniques such as those discussed in reference to FIGS. 2A and 2B.

In a further aspect, the system 300 may include or have access to an async timer reference database 310, which stores data indicating different async-timer durations (i.e., different length periods) corresponding to different backhaul-latency indicator values. For example, the reference database may specify different periods corresponding to different combinations of RNC-processor usage and RNC-BTS round-trip delay. Other database structures are also possible.

It should be understood that while references may be made herein to a BTS receiving a TCA message from an RNC, the TCA message received from the RNC may or may not be identical in form and content as the TCA message that the BTS ultimately sends to the access terminal. In particular, the RNC may send the BTS information identifying the assigned traffic channel and possibly other information, which the BTS may include in the TCA message that it transmits to the access terminal. Accordingly, references to the BTS receiving a TCA message should be understood to encompass the BTS receiving information from the RNC to be included in a TCA message (such an identifier for the assigned traffic channel).

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for transmitting traffic channel assignment (TCA) messages in a radio access network, the method comprising:
    (a) periodically transmitting an asynchronous capsule that includes one or more TCA messages, wherein an asynchronous-capsule timer specifies a period that is used to periodically transmit the asynchronous capsule; and
    (b) using one or more backhaul-latency indicators as a basis for determining the period specified by the asynchronous-capsule timer, wherein:
        (i) if the one or more backhaul-latency indicators indicate a higher backhaul latency, the period specified by the asynchronous-capsule timer is decreased; and
        (ii) if the one or more backhaul-latency indicators indicate a lower backhaul latency, the period specified by the asynchronous-capsule timer is increased;
    wherein periodically transmitting an asynchronous capsule comprises separately transmitting each of a plurality of asynchronous capsules, wherein transmission of a given one of the plurality of asynchronous capsules is separated from transmission of a next of the plurality of asynchronous capsules by the period specified by the asynchronous-capsule timer, wherein a first of the plurality of asynchronous capsules is transmitted at a first point in time with a first set of one or more TCA messages, and wherein, after transmitting the first asynchronous capsule and then waiting for the period specified by the timer, a second of the plurality of asynchronous capsules is transmitted with a second set of TCA messages, wherein the second set of TCA messages includes substantially all TCA messages received from a radio network controller (RNC) in between transmitting the first asynchronous capsule and transmitting the asynchronous second capsule.

2. The method of claim 1, further comprising periodically repeating (b) in order to periodically update the timer to reflect changes in backhaul latency.

3. The method of claim 1, further comprising:
    (c) determining a current value for each of the one or more backhaul-latency indicators; wherein the current values of the one or more backhaul-latency indicators are used as the basis for determining the period that is used to periodically transmit the asynchronous capsule.

4. The method of claim 3, further comprising periodically repeating (c) and (b) in order to periodically update the period specified by the asynchronous-capsule timer to reflect changes in backhaul latency.

5. The method of claim 1, wherein the radio access network provides service under an EV-DO protocol, and wherein the asynchronous capsule is transmitted over a control channel in a sector of the radio access network.

6. The method of claim 1, wherein the access network comprises a radio network controller (RNC), and wherein the one of the backhaul-latency indicators is RNC-processor usage.

7. The method of claim 1, wherein the access network comprises a radio network controller (RNC) and a base transceiver station (BTS), wherein a communication path exists between the RNC and the BTS, and wherein the backhaul-latency indicators comprise at least one of (a) RNC-processor usage and (b) at least one traffic characteristic of the BTS-RNC communication path.

8. The method of claim 7, further comprising, determining at least one of (a) the RNC-processor usage and (b) the traffic characteristics of the communication path.

9. The method of claim 8, wherein determining the RNC-processor usage level comprises receiving from the RNC a measure of its RNC-processor usage.

10. The method of claim 8, wherein determining the RNC-processor usage level further comprises requesting from the RNC a measure of its RNC-processor usage.

11. The method of claim 8, wherein determining the traffic characteristic of the BTS-RNC communication path comprises determining round-trip delay between the BTS and the RNC on the BTS-RNC communication path.

12. The method of claim 1, wherein the access network comprises the RNC and a base transceiver station (BTS), the method further comprising:
    in between consecutive periodic transmissions of the asynchronous capsule that includes one or more TCA messages:
        at the BTS, receiving one or more TCA messages from the RNC; and
        storing each received TCA message; and
    including the stored TCA messages in the next periodic transmission of the asynchronous capsule.

13. A method for transmitting traffic channel assignment (TCA) messages in a radio access network, the method comprising:
    (a) starting an asynchronous-capsule timer that runs for a specified period;
    (b) after starting the asynchronous-capsule timer and before expiration of the asynchronous-capsule timer, receiving one or more TCA messages from a radio network controller (RNC);
    (c) upon the expiration of the asynchronous-capsule timer, sending an asynchronous capsule that includes the one or more received TCA messages;
    (d) determining one or more backhaul-latency indicators;
    (e) based at least in part on the backhaul-latency indicators, updating the specified period for which the asynchronous-capsule timer runs, wherein:
        (i) if the one or more backhaul-latency indicators indicate a higher backhaul latency, the period specified by the asynchronous-capsule timer is decreased; and
        (ii) if the one or more backhaul-latency indicators indicate a lower backhaul latency, the period specified by the asynchronous-capsule timer is increased; and
    (f) after updating the specified period, periodically repeating (a)-(c) according to the period specified by the asynchronous-capsule timer.

14. A system configured to transmit TCA messages in a coverage area of a radio access network, the system comprising:
    a communication interface configured to engage in air-interface communications;
    at least one processor;

program logic that is executable by the at least one processor to:
(a) periodically transmit an asynchronous capsule, wherein each transmitted asynchronous capsule includes one or more TCA messages;
(b) provide an asynchronous-capsule timer that specifies a period that is used to periodically transmit the asynchronous capsule that includes one or more TCA messages; and
(c) use one or more backhaul-latency indicators as a basis to determine the period specified by the asynchronous-capsule timer, wherein:
(i) if the one or more backhaul-latency indicators indicate a higher backhaul latency, the period specified by the asynchronous-capsule timer is decreased; and
(ii) if the one or more backhaul-latency indicators indicate a lower backhaul latency, the period specified by the asynchronous-capsule timer is increased;
wherein periodic transmission of an asynchronous capsule comprises separate transmission of each of a plurality of asynchronous capsules, wherein transmission of a given one of the plurality of asynchronous capsules is separated from transmission of a next of the plurality of asynchronous capsules by the period specified by the asynchronous-capsule timer, wherein a first of the plurality of asynchronous capsules is transmitted at a first point in time with a first set of one or more TCA messages, and wherein, after transmitting the first asynchronous capsule and then waiting for the period specified by the timer, a second of the plurality of asynchronous capsules is transmitted with a second set of TCA messages, wherein the second set of TCA messages includes substantially all TCA messages received from a radio network controller (RNC) in between transmitting the first asynchronous capsule and transmitting the asynchronous second capsule.

15. The system of claim 14, wherein the system is implemented in a radio access network that provides EV-DO service, and wherein the system is implemented in at least one of (a) a BTS and (b) an RNC in the radio access network.

16. The system of claim 14, wherein the system comprises a BTS configured to communicate with an RNC via a communication path, and wherein the backhaul-latency indicators include at least one of (a) RNC-processor usage and (b) one or more traffic characteristics of the BTS-RNC communication path.

17. The system of claim 16, wherein the system further comprises program logic that is executable by the at least one processor to determine a measure of RNC-processor usage.

18. The system of claim 16, wherein the system further comprises program logic that is executable by the at least one processor to determine a round-trip delay between the RNC and the BTS as a traffic characteristic of the BTS-RNC communication path.

19. The system of claim 16, wherein the system is further configured to receive TCA messages from an RNC, and wherein the asynchronous capsule includes, in each transmission, substantially all TCA messages received from the RNC since the asynchronous capsule was last transmitted.

* * * * *